United States Patent
Szymocha et al.

(10) Patent No.: US 6,695,077 B2
(45) Date of Patent: Feb. 24, 2004

(54) THERMAL PROCESS FOR TREATING HYDROCARBON-CONTAMINATED DRILL CUTTINGS

(75) Inventors: Kazimierz S. Szymocha, Edmonto (CA); Barry E. McIntyre, Calgary (CA)

(73) Assignee: Q'Max Solutions Inc. (CA)

( * ) Notice: Subject to any disclaimer, the term of this patent is extended or adjusted under 35 U.S.C. 154(b) by 0 days.

(21) Appl. No.: 10/080,993

(22) Filed: Feb. 20, 2002

(65) Prior Publication Data
US 2003/0155158 A1 Aug. 21, 2003

(51) Int. Cl.[7] .......................... E21B 21/01; E21B 21/06; B01D 1/14; B08B 3/10
(52) U.S. Cl. ..................... 175/66; 134/25.1; 175/206; 210/770; 210/771; 588/249; 588/252
(58) Field of Search ..................... 134/22.16, 25.1; 175/66, 206; 210/770, 771; 588/230, 249, 252

(56) References Cited

U.S. PATENT DOCUMENTS

| | | | | |
|---|---|---|---|---|
| 2,276,075 A | * | 3/1942 | Wuensch | 175/66 |
| 3,637,031 A | * | 1/1972 | Hull et al. | 175/66 |
| 4,161,222 A | * | 7/1979 | Pye | 175/66 |
| 4,222,988 A | * | 9/1980 | Barthel | 422/309 |
| 4,725,362 A | * | 2/1988 | Dugat | 210/710 |
| 4,778,606 A | | 10/1988 | Meenan et al. | |
| 5,005,655 A | * | 4/1991 | Stokke et al. | 175/66 |
| 5,200,033 A | | 4/1993 | Weitzman | |
| 5,882,381 A | | 3/1999 | Hauck et al. | |
| 6,162,284 A | * | 12/2000 | Mitchell et al. | 95/261 |
| 6,530,438 B1 | * | 3/2003 | McIntyre | 175/66 |

FOREIGN PATENT DOCUMENTS

| | | |
|---|---|---|
| DE | 36 04 761 | 8/1987 |
| GB | 2 349 656 | 11/2000 |
| WO | WO 00/49269 | 8/2000 |

* cited by examiner

Primary Examiner—George Suchfield
(74) Attorney, Agent, or Firm—Bachman & LaPointe, P.C.

(57) ABSTRACT

Hydrocarbon contaminants in drill cuttings generated in an oil drilling operation are removed by mixing the drill cuttings with an agglomerant to produce a pre-treatment mixture; heating to vaporize the hydrocarbon contaminants under a condition in which vapor entrainable particles of the drill cuttings are agglomerated by the agglomerant, and caking of drill cuttings is inhibited; drill cuttings having a reduced content of the contaminant are removed, and vaporized hydrocarbons having a reduced content of vapor entrainable particles are recovered. In this way, the particulate content of vapors escaping from the drill cuttings is reduced.

45 Claims, 2 Drawing Sheets

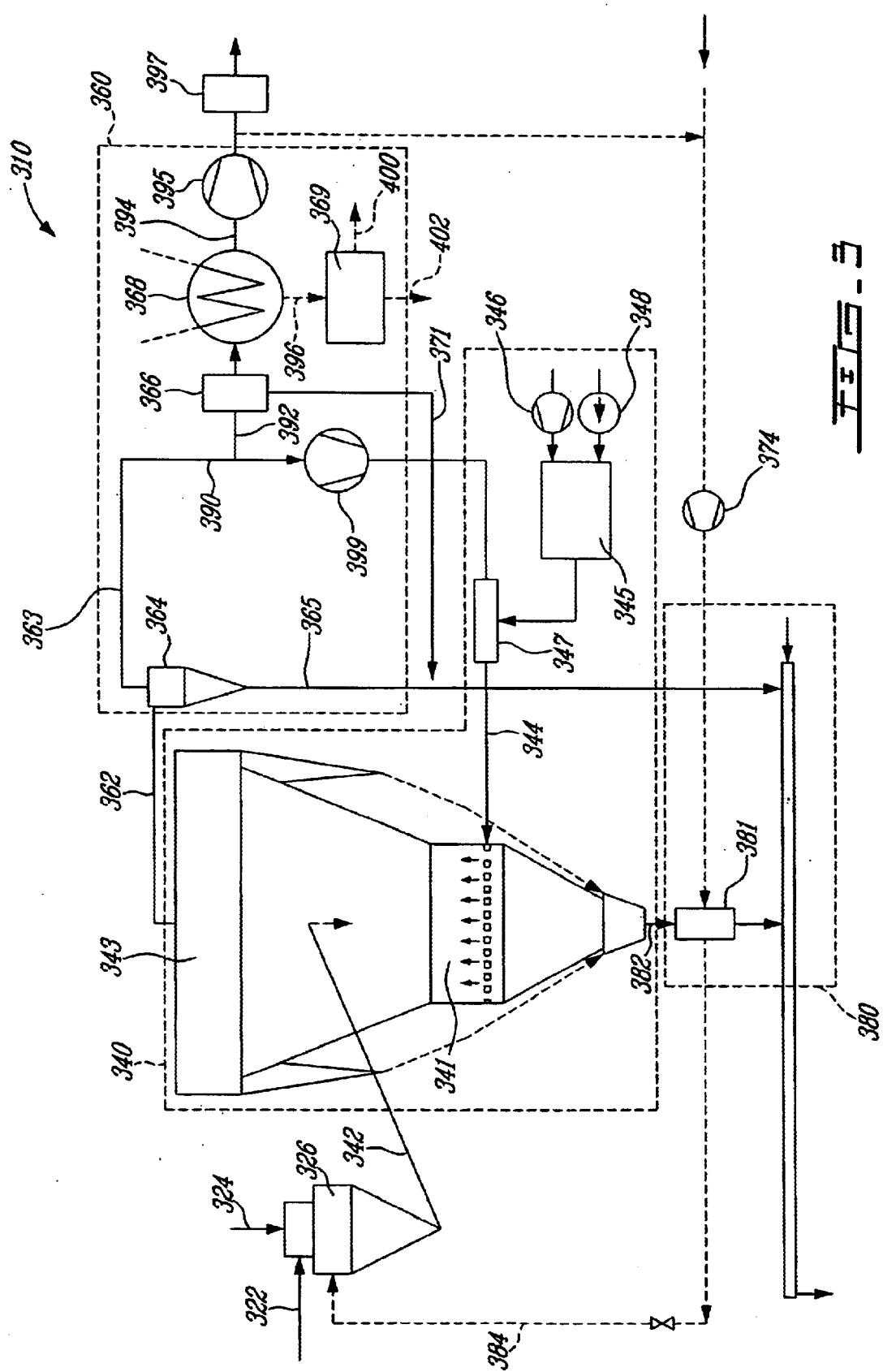

THERMAL PROCESS FOR TREATING HYDROCARBON-CONTAMINATED DRILL CUTTINGS

FIELD OF THE INVENTION

The present invention relates to the field of treating hydrocarbon-contaminated drill cuttings and, in particular to the field of thermal desorption treatment of hydrocarbon-contaminated drill cuttings.

BACKGROUND OF THE INVENTION

Environmental regulations governing the use of oil-based drilling fluids have been tightened, especially for offshore drilling operations, because of potential adverse effects of discharged drill cuttings on the environment. Specifically, oil-based drilling fluids typically have very poor biodegradability in anaerobic conditions, such as those found in deep seawater. Accordingly, piles of cuttings, whose physicochemical properties do not significantly change, if at all, under such anaerobic conditions, build-up on the seafloor forming potentially environmentally harmful deposits. Also, some drilling fluids have high levels of aromatic hydrocarbons that could have potential adverse toxicity issues.

Because of shortcomings in off-shore treatment of drill cuttings, drill cuttings are sometimes collected and transported to shore for treatment and disposal. This increases the risk of accidental release of drill cuttings into water when transporting from the rig to the shore for on-shore treatment. Since offshore drilling rigs offer limited space, especially for storage of drill cuttings, efforts have turned to effective off-shore treatment of drill cuttings. But one of the disadvantages of off-shore cuttings treatment is the limited space available for equipment.

A number of known processes use a fluidized bed for vaporizing contaminants from solids. However, as discussed below, most of the processes produce significant quantities of fine particulates in the gas stream exiting the fluidized bed. Particulates pose problems in recovery of liquids and in off-gas released to the atmosphere. Therefore, many of the processes discussed below require an extensive dust collection system, such as a cyclone or baghouse filter, for removing particulates.

WO00/49269 (McIntyre, Aug. 24, 2000) describes a thermal desorption process in which drilling fluid vapors are thermally desorbed from drill cuttings. Hydrocarbon-contaminated drill cuttings are fed to a pressurized desorption chamber where a hot heating gas (e.g., 400–600° F. (204–316° C.)) is pumped into the chamber to heat the drill cuttings by convection. A mixture of drilling fluid vapors and heating gas is discharged through an overhead vapor outlet and cleaned drill cuttings are removed through an underflow cuttings outlet.

The gas mixture is preferably processed in a cyclone to remove fine particles entrained in the gas. The gas mixture is then condensed to recover drilling fluid vapor in liquid form for recycling to a drilling fluid storage and circulating system.

U.S. Pat. No. 5,882,381 (Hauck et al., Mar. 16, 1999) also describes a thermal desorption system for treating hydrocarbon-contaminated solids, in this case a vacuum thermal desorption system. An inert gas generator is used to maintain low $O_2$ (below 7%) to prevent combustion in the process gas stream. The inert gas is fed to a fluidized bed at a temperature in a range from 600 to 1,600(F (316–871° C.) to vaporize the contaminants.

The process gas exiting the fluidized bed contains entrained solids that are removed in a high temperature baghouse filter, such as a pulse jet ceramic filter dust collector. The gas stream exiting the baghouse filter is then treated in a pre-cooler and a condenser to remove any remaining particulate matter, water and contaminant.

U.S. Pat. No. 4,778,606 (Meenan et al., Oct. 18, 1988) relates to a process and apparatus for treating a polychlorinated biphenyl (PCB) contaminated solid. A contaminated sludge (5 to 90% $H_2O$) is contacted with very hot air and combustion gases in a separator at a temperature of 850 to 2,500° F. (454–1,371° C.) The separator dries, classifies and conveys the sludge in a continuous operation. In the lower portion of the separator, partially dry particulates are fluidized to vaporize contaminants. Fine particulate matter is entrained in the gas flow out of the separator and fed to a cyclone separator.

Any particulate matter containing excess contaminant may be returned to a mixer upstream of the separator for recycling. The mixer mixes the dried particulate matter with the incoming sludge for feeding to the separator.

Meenan et al. suggest that, if desired, additional material such as clean water or chemicals can be added to the sludge in the mixer/feeder to provide a sludge having a predetermined percentage (e.g., 50% by weight water) or to disinfect or otherwise treat the sludge in the mixer.

Schattenberg (DE 36 04 761 A1, Aug. 20, 1987) also describes a thermal desorption for treating hydrocarbon-contaminated soil using a rotary tube or fluid bed. An inert carrier gas, such as nitrogen, is used for heating the soil to the boiling temperature of the hydrocarbon contaminant (e.g., 400° C. (752° F.)). Nitrogen, water vapor and vaporized hydrocarbons flow out of the rotary tube or fluid bed through a de-duster for separating particulates and then through a distillation tower for separating water and oil.

None of the above-mentioned processes describe or suggest treating the solids prior to thermal desorption in a manner to reduce the particulate discharge or to increase the particle size.

Weitzman (U.S. Pat. No. 5,200,033, Apr. 6, 1993) suggests using a binder in a solidification/stabilization process. Weitzman's thermal desorption process uses a thermal contactor with electric or fluid-heated walls. Contaminated solids are agitated and moved through the combustor by steam jets, air jets, mechanical rakes, ploughs or arms. The wall temperature increases downstream in the direction of the solids movement to heat the solids and release volatile components. A purge gas, such as a non-condensible gas or superheated steam, is used to purge the volatile components released from the solids.

Binders may be added to stabilize and solidify the contaminated solids. Suggested binders include Portland cement, pozzolanic materials, fly ash, cement kiln dust, lime kiln dust, quicklime, calcium hydroxide, calcium oxide, magnesium compounds, sodium hydroxide, and soluble silicates. The binders may be fed separately into the chamber or premixed with contaminated soil.

Gases from the chamber are condensed to remove contaminant and water vapor and then passed through a particulate collection device (e.g., electrostatic precipitator, scrubber or fabric filter). Weitzman recognized that many types of solids will cake on hot surfaces such as the walls of the contactor. Accordingly, he provides a series of scrapers or rakes to scrape the walls of the contactor.

But drill cuttings are particularly prone to caking when heated due to the nature of the solids and the drill fluids.

While processes like Weitzman's can scrape the walls of the thermal contactor to deal with caking, fluidized bed processes are not conducive to such devices. Also, when caking occurs, a solid external layer traps hydrocarbon contaminants inside the cake, Resulting in ineffective treatment. Therefore, those skilled in the art have avoided adding additional components to the contaminated solids that might cause further caking.

On the other hand, thermal desorption processes and, in particular, fluidized bed processes, produce fine particulates that are not easy to deal with, especially when there are space limitations.

SUMMARY OF THE INVENTION

According to one aspect of the present invention, there is provided a process for removing hydrocarbon contaminant from drill cuttings generated in an oil drilling operation, comprising:

i) mixing drill cuttings containing a hydrocarbon contaminant with an agglomerant to produce a pre-treatment mixture;

ii) heating the pre-treatment mixture at a temperature effective to vaporize the hydrocarbon contaminant of the drill cuttings, under a condition in which drill cuttings particles that are normally vapor entrainable are agglomerated by the agglomerant, and caking of drill cuttings is inhibited;

iii) recovering drill cuttings having a reduced content of the contaminant, and iv) recovering vaporized hydrocarbons having a reduced content of vapor entrainable particles.

According to a particular embodiment of the invention, there is provided the process for treating drill cuttings contaminated with at least one hydrocarbon, comprising the steps of:

(a) providing hydrocarbon-contaminated drill cuttings with a first particle size distribution having a first median diameter;

(b) mixing the hydrocarbon-contaminated drill cuttings with an agglomerant to produce a pre-treatment mixture;

(c) establishing a pre-treatment total liquid content in the pre-treatment mixture in a range from about 5 wt. % to about 20 wt. %, based on the total weight of the pre-treatment mixture;

(d) agitating and heating the pre-treatment mixture at a temperature sufficient to vaporize substantially all of the hydrocarbon while agglomerating vapor entrainable particles of the drill cuttings to form agglomerates; and (e) recovering treated drill cuttings with a second particle size distribution having a second median diameter greater than the first median diameter, the treated drill cuttings having a residual hydrocarbon content of less than or equal to about 3 wt. %, based on the total weight of the treated drill cuttings.

BRIEF DESCRIPTION OF THE DRAWINGS

The thermal desorption process of the present invention will be better understood by referring to the following detailed description and the drawings referenced therein, in which:

FIG. 3 is a flow diagram of a further embodiment of a thermal process for treatment of hydrocarbon-contaminated drill cuttings used in Example 1.

DETAILED DESCRIPTION OF THE PREFERRED EMBODIMENTS

Figure 1:
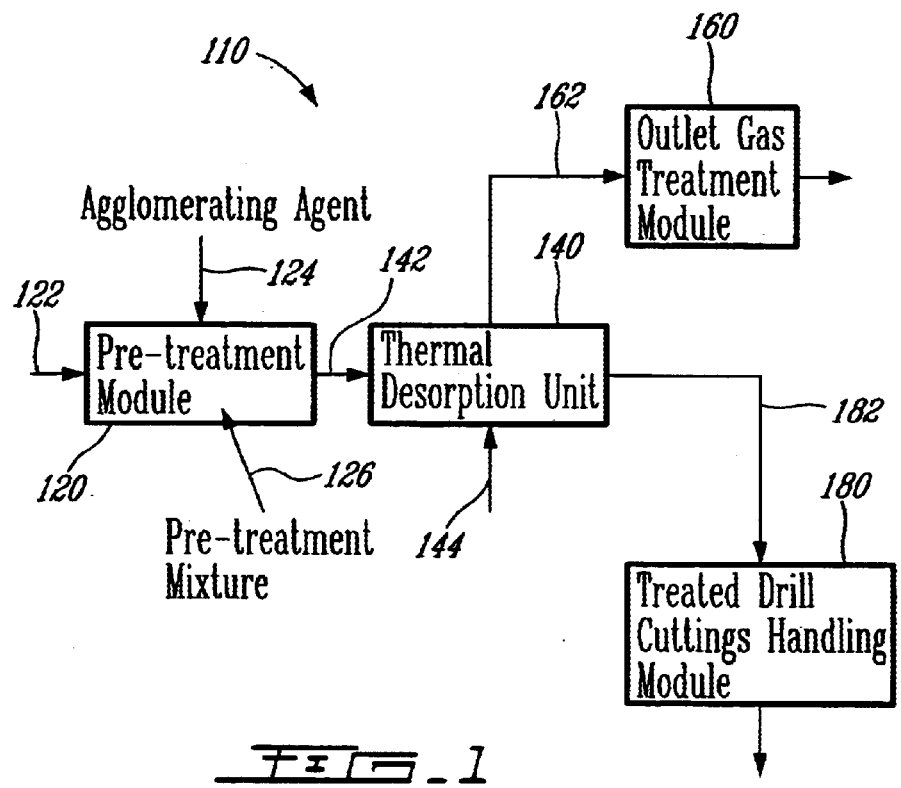
FIG. 1 is a flow diagram of one embodiment of a thermal process for treatment of hydrocarbon-contaminated drill cuttings.

Definitions Particle size is usually expressed by the dimension of its "particle diameter." Non-spherical particles are commonly described to be equivalent in diameter to a sphere having the same mass, volume, surface area or settling speed as the non-spherical particle in question. Particle diameter is typically expressed in units of $\mu$m (i.e., $10^{-6}$ m).

"Median diameter" means the particle diameter where half of a measured quantity (mass, surface area, number) of particles have a particle diameter less than that diameter. Accordingly, the median diameter, $d_{50}$, is a measure of central tendency and can be readily estimated, especially when data are presented in cumulative form. Data may be obtained, for example, from sieve analysis.

An "agglomerate" is a cluster of two or more particles held together by physical, chemical and/or physicochemical interactions.

An "agglomerating agent" is a substance that will bind solid particles together to form an agglomerate after carrier liquid is vaporized.

An "agglomerant" is a solution or mixture of agglomerating agent and a carrier liquid.

"Total liquid content" ("TLC") is the total weight of all liquids in a mixture, including bulk liquids, liquids on the solid particle surfaces and liquids absorbed into solid particles. The conditions for the liquid phase are atmospheric pressure and operating temperatures. Liquids in a mixture can include, without limitation, water, hydrocarbons, aqueous salt solutions, agglomerants, emulsifiers, surfactants, and combinations thereof.

"Hydrocarbon-contaminated drill cuttings" ("HC-contaminated drill cuttings") are rock particles and drilling fluid retrieved from a well drilling operation. The exact composition of the drill cuttings will vary from one operation to another and during an operation due to changing rock composition and drilling fluid composition. However, hydrocarbon-contaminated drill cuttings comprise, without limitation, hydrocarbons, water, shales, clays, sandstone, carbonates, drilling fluids and combinations thereof.

"Vapor entrainable particles" are particles, especially fine particles, of the drill cuttings which have physical characteristics such that they may be entrained in the hydrocarbon vapor which escapes from the pre-treatment mixture by vaporization during the heating step. It likewise includes such particles which may be entrained by gases, typically inert carrier gases, which pass through the pre-treatment mixture during the heating step.

Process

In accordance with the present invention, hydrocarbon-contaminated ("HC-contaminated") drill cuttings are mixed with an agglomerant to produce a pre-treatment mixture. The pre-treatment mixture is heated to vaporize the hydrocarbon contaminant of the drill cuttings while agglomerating vapor entrainable particles of the drill cuttings, to form agglomerates which are not entrained by the hydrocarbon vapor escaping from the pre-treatment mixture.

In a particular embodiment, the total liquid content ("TLC") of the pre-treatment mixture is controlled to a liquid content in a range from about 5 wt. % to about 20 wt. %, based on the total weight of the pre-treatment mixture. The mixture is then agitated and heated in a thermal desorption unit so that (1) agglomerates are formed and (2) substantially all of the hydrocarbon is vaporized. Typically, the hydrocarbon may comprise $C_8$ to $C_{24}$ hydrocarbons. By producing agglomerates, particularly of fine particles, the amount of fine particles entrained in gas exiting the thermal desorption unit is significantly reduced. However, the agglomerates are not so large as to produce caking in the thermal desorption unit.

In general, hydrocarbon contaminated drill cuttings are fluidizable and so it is especially convenient to carry out the heating or thermal desorption, with the contaminated drill cuttings in a fluidized state. The gas employed for the establishment of the fluidized state will typically be an inert gas such as nitrogen and flow of such gas through the pre-treatment mixture serves to assist the egress or escape of vapors of the hydrocarbon contaminant from the pre-treatment mixture.

In general, treated drill cuttings have a median diameter that is greater than the median diameter of the HC-contaminated drill cuttings prior to treatment. Moreover, the residual HC content in the treated drill cuttings is less than about 3 wt. %, based on the total weight of the treated drill cuttings.

The benefits of the process described herein include, without limitation, (1) reduced particulate concentration in gas exiting the thermal desorption unit, (2) treated drill cuttings that can be more safely disposed of due to reduced HC content, (3) HC are recovered and, as a result of reduced particulate content in condensed recovered HC can be re-used if desired and (4) reduced space requirement both for land and on off-shore platform compared to conventional processes.

Process Description

Referring now to FIG. 1, a thermal process 110 for treating HC-contaminated drill cuttings 122 has a Pre-Treatment Module 120, a Thermal Desorption Module 140, an Outlet Gas Treatment Module 160 for treating outlet gas from the Thermal Desorption Module 140 and a Treated Drill Cuttings Handling Module 180 for handling treated drill cuttings from the Thermal Desorption Module 140. Each of the modules is discussed more fully below.

The inventive thermal process may be operated in a batch, fed-batch, continuous, semi-continuous or continual mode, for example, depending on the required throughput vs. the process capacity. Preferably, the inventive thermal process is operated in a continuous mode.

Pre-Treatment Module

HC-contaminated drill cuttings 122 are pre-treated in the Pre-Treatment Module 120 prior to being fed to the Thermal Desorption Module 140. In particular, the feed HC-contaminated drill cuttings 122 are mixed with an agglomerant 124, discussed more fully below, to produce a pre-treatment mixture 126. The total liquid content ("TLC") of the pre-treatment mixture is controlled in a range from about 5 wt. % to about 20 wt. %, based on the total weight of the pre-treatment mixture 126.

The feed HC-contaminated drill cuttings 122 typically have a first median diameter in a range from about 15 $\mu$m to about 400 $\mu$m ($10^{-6}$ m). The TLC of HC-contaminated drill cuttings 122 may change from operation to operation and from stage to stage in an operation. However, the TLC is usually in a range from about 5 wt. % to about 40 wt. %, more typically in a range from about 15 wt. % to about 20 wt. %, based on the total weight of the HC-contaminated drill cuttings 122.

After mixing the agglomerant 124, the pre-treatment mixture 126 should have a TLC ($TLC_{PT}$)in a range from about 5 wt. % to about 20 wt. %, based on the total weight of the pre-treatment mixture 126. At a $TLC_{PT}$ less than about 5 wt. %, agglomerates are less likely formed and at a $TLC_{PT}$ greater than about 20 wt. %, agglomeration will be uncontrolled and caking may occur. In particular trials, it was found that at $TLC_{PT}$ of about 40 wt. %, a thermal desorption unit was caked after 2 hours operation such that operation had to be discontinued. At a $TLC_{PT}$ of about 20 wt. %, on the other hand, the same unit operated for 24 hours before caking required that the operation be interrupted for removal of caked material. Preferably, the $TLC_{PT}$ is in a range from about 10 wt. % to about 18 wt. %. More preferably, the $TLC_{PT}$ is in a range from about 14 wt. % to about 17 wt. %.

The TLC can be measured by a retort test commonly used in the drilling fluid business or any suitable commercially available test method.

If the $TLC_{PT}$ is outside the desired range, the TLC should be adjusted as discussed below. However, it will be understood that there may be operations or stages of operations, where the pre-treatment mixture 126 will be in the desired range and no TLC adjustment is required.

The $TLC_{PT}$ in the pre-treatment mixture 126 can be controlled in a number of ways. For example, to reduce the TLC, liquid can be removed from the drill cuttings and/or relatively drier solids can be mixed with the HC-contaminated drill cuttings 122. In either case, the TLC can be reduced prior to and/or after adding agglomerant 124. However, when removing liquid, it is preferable to do so prior to adding agglomerant 124. Otherwise, agglomerant 124 may be lost.

For example, when the TLC of the HC-contaminated drill cuttings ($TLC_{DC}$) 122 prior to adding agglomerant 124 is greater than about 20 wt. %, liquid can be removed from the drill cuttings. Liquid can be removed, for example, without limitation, by passing at least a portion of the HC-contaminated drill cuttings 122 through a press (not shown), a shaking screen (not shown), a centrifuge (not shown) or a combination thereof.

At a $TLC_{DC}$ less than about 20 wt. %, liquid removal by these mechanical devices becomes more difficult. Accordingly, when less than about 20 wt. %, it is preferable to add relatively drier solids to the HC-contaminated drill cuttings 122. In a preferred embodiment, illustrated in FIG. 2 and discussed more fully below, at least a portion of the treated drill cuttings 284 can be recycled to the Pre-Treatment Module 226 to reduce the $TLC_{DC}$ to the desired level. The treated drill cuttings 284 may be cooled or used in a warm or hot state following treatment.

An advantage of using previously treated drill cuttings 284 is that the total amount of solids that must later be disposed of does not increase beyond the amount recovered from the drilling operation. Alternatively, other drier granular material may be added to the HC-contaminated drill cuttings 122. Examples of suitable drier granular material include, without limitation, ground rock, gypsum, clay, sand, silt and combinations thereof.

The median diameter of any solids, whether recycled treated drill cuttings, other drier granular material or a combination thereof, is preferably in a range from about 30 $\mu$m to about 400 $\mu$m.

To increase TLC, liquid including additional agglomerant 124, seawater and/or liquid recovered from the process can be added to the HC-contaminated drill cuttings 122 and/or pre-treatment mixture 126.

The pre-treatment mixture 126 should be mixed sufficiently to produce a substantially homogeneous mixture. Examples of suitable mixing devices include, without limitation, ribbon screw mixers, helical screw mixers, pug mills, and combinations thereof.

The pre-treatment mixture 126 is then fed to the Thermal Desorption Unit 140 via feeding means 142. Examples of suitable feeding means include, without limitation, augers, conveyor belts, and combinations thereof.

Agglomerant and Agglomerating Agent

As defined above, an agglomerant is a solution or mixture of a liquid and an agglomerating agent, used to hold two or more particles together to form an agglomerate. Preferably, the liquid used to produce the agglomerant is water or an aqueous solution. Suitable agglomerating agents include substances that (1) form solid bridges on drying, (2) hold particles together with mobile liquid interfacial forces and densify, thicken or harden when heated and/or (3) hold particles together with intramolecular and electrostatic forces.

Solid bridges are formed by crystallization of the agglomerating agent when the agglomerating agent dries under thermal processing conditions. Examples of agglomerating agents that form solid bridges include, without limitation, alkali metal and alkaline earth metal salts Another suitable bridging mechanism is provided by agglomerants that initially hold particles together with mobile liquid interfacial forces. The agglomerant, holds particles together with lens-shaped rings at points of contact between particles. After thermal desorption, the agglomerant solidifies, as do many adhesives. Starches are suitable agglomerating agents for this class of agglomerant.

A third class of agglomerating agents are those in which intramolecular and electrostatic forces hold particles together without the presence of material bridges, such as those formed with mobile liquid bridges and solid bridges. In this case, agglomerates are formed with particles of agglomerating agent contacting drill cutting particulates under agitation Agglomerating agents that hold particles together by mechanical interlocking and immobile liquid bridges are less preferred for use in the inventive thermal process because the agglomerate strength with the bonding mechanisms is typically not sufficient to hold the agglomerate together during processing.

There are a number of known agglomerating agents, however, in order to achieve the best results as an agglomerating agent for the inventive HC-contaminated drill cuttings treatment process, the agglomerating agent should preferably meet the following criteria:

1. Stable at the temperature used in the thermal desorption unit 140. For example, the agglomerating should be stable at temperatures in the range from about 200° C. to about 400° C. Clearly, the agglomerating agent should not thermally decompose and not vaporize at the thermal desorption unit processing temperature;
2. Compatible with HC-based drilling fluids. In particular, the agglomerating agent should suitably be inert and not react with components of HC-based drilling fluids, in any way that would interfere with the agglomerating function;
3. Mixable with wet HC-contaminated drill cuttings to form a sufficiently homogeneous mixture; and
4. Provide sufficient strength to maintain the integrity of the formal agglomerates during the process. The strength required is dependent on the process and equipment used. However, preferably the resulting agglomerate strength is at least about 200 kPa.

Preferably, the agglomerating agent also meets environmental standards for off-shore and/or landfill disposal of treated drill cuttings. More preferably, the agglomerating agent meets environmental standards for on-site disposal of treated drill cuttings.

Selection of an agglomerating agent and the appropriate concentration may be determined for a specific process and equipment by bench scale testing using a bench scale model of the designed thermal process.

Examples of suitable salts include alkali metal chlorides, chlorites, nitrates, nitrites, sulfates, sulfides, sulfites, carbonates, and alkaline-earth metal chlorides, chlorites, nitrates, nitrites, sulfates, sulfides, sulfites, carbonates, and combinations thereof. Preferred salts include NaCl, $CaCl_2$, KCl and combinations thereof.

Examples of suitable starches include corn starch, potato starch and combinations thereof.

As mentioned above, agglomerating agents should provide sufficient strength to maintain the integrity of the agglomerate during processing. Factors affecting agglomerate strength include, for example, without limitation, temperature, degree of blending, agglomerating agent concentration, and TLC of the pre-treatment mixture.

The agglomerating agent concentration is preferably in a range from about 0.2 wt. % to about 5 wt. %, based on the total weight of the pre-treatment mixture.

Thermal Desorption Unit

Once the pre-treatment mixture 126 is fed to the Thermal Desorption Unit 140 via feeding means 142, the mixture is agitated and heated in the thermal desorption unit 140.

The thermal desorption unit 140 provides at least forced convection heating to heat the pre-treatment mixture by direct contact with a hot feed gas 144. The feed gas 144 should be at a temperature sufficient to vaporize the hydrocarbon (HC) in the HC-contaminated drill cuttings. Preferably, the feed gas 144 is introduced to the thermal desorption unit 140 at a temperature in a range from about 200° C. to about 500° C. At temperatures greater than 500° C., there is a possibility of HC coking occurring, with deposits being formed on equipment surfaces.

Examples of suitable thermal desorption units include, without imitation, fluidized beds, spouted beds, rotating tumblers, vibrating conveyors, shaking conveyors, and combinations thereof. Preferably, the thermal desorption unit is a fluidized bed.

The feed gas 144 used for heating the HC-contaminated drill cuttings is preferably inert to the HC-contaminated drill cuttings or substantially non-oxidizing to reduce the chance of hydrocarbon vapors igniting. More preferably, the feed gas 144 to the thermal desorption unit 140 has less than about 8% oxygen on a mole fraction basis. Most preferably, the feed gas 144 is selected from the group consisting of nitrogen, carbon dioxide, steam and combinations thereof.

Outlet gas 162 from the thermal desorption unit 140 is fed to Outlet Gas Treatment Module 160, discussed more fully below. In a preferred embodiment, illustrated in FIG. 2 and discussed more fully below, the outlet gas 262 is passed through a preliminary solids separation unit 250, typically a cyclone, and a portion of this gas 246 is recirculated to the thermal desorption unit 240. In this case, the treated outlet gas 246 recirculated to the thermal desorption unit 240 would include any gas initially introduced, steam, and HC vapors.

The average residence time in the thermal desorption unit 140 will depend on a number of factors including, without limitation, the capacity of the unit, the type of thermal desorption unit, temperature, pre-treatment mixture flow rate, $TLC_{PT}$ and gas flow rate. However, generally, when the thermal desorption unit is a fluidized bed, the average residence time is preferably in a range from about 1 minute to about 15 minutes. More preferably, the average residence time in the fluidized bed is in a range from about 3 minutes to about 6 minutes.

As the drill cuttings are mixed, heated and agitated in the fluidized bed, agglomerates form. Drill cuttings treated in conventional processes may have (1) uncontrolled agglomeration which in turn causes caking and/or (2) significant particulates entrained in the gas exiting the thermal desorption unit. By controlling the $TLC_{PT}$ and using an agglomerating agent, caking is significantly reduced so that (a) there is little down-time for the equipment and (b) the HC is more completely vaporized from the drill cuttings. At the same time, the amount of particulates entrained in the outlet gas is significantly reduced, thereby significantly reducing gas treatment for particulates.

Outlet Gas Treatment Module

Outlet gas 162 exiting the thermal desorption unit 140 is fed to an Outlet Gas Treatment Module 160. The outlet gas treatment module 160 may include, without limitation, one or more processes for removing residual entrained particles, reducing the temperature of the outlet gas, condensing water vapor, and separating hydrocarbon vapor.

Entrained particulates generally have a particle diameter in a range up to about 30 $\mu$m. One of the advantages of the inventive HC-contaminated drill cuttings treatment process is that the amount of particulates entrained in the outlet gas 162 is significantly reduced compared to conventional drill cuttings treatment processes.

Residual particulates entrained in the outlet gas 162 may be removed, for example, without limitation, by centrifugal vortex separation, cyclone separation, bag-house separation, impingement, centrifugal separation, granular-bed separation, filtration, electrostatic precipitation, inertia separation and combinations thereof.

The outlet gas 162 is preferably treated to reduce the temperature of the outlet gas 162 prior to releasing to the environment. For example, the temperature of the outlet gas 162 exiting the thermal desorption unit 140 may be in a range from about 200° C. to about 400° C. Preferably, the temperature is reduced to 100° C., preferably about 40° C., prior to releasing the gas to the atmosphere.

As the outlet gas 162 is cooled, water and HC vapor will condense. Preferably, the condensed HC is separated from water In a preferred embodiment, the condensed and separated HC is recycled for use in the drilling operation. Because the entrained particulates are significantly reduced, as compared to conventional HC-contaminated drill cutting treatment processes, the condensed HC recovered in the outlet gas treatment module 160 has a significantly reduced solids loading. Preferably, the condensed HC has a solids loading less than about 10 wt. %, based on the total weight of the condensed HC.

Figure 2:
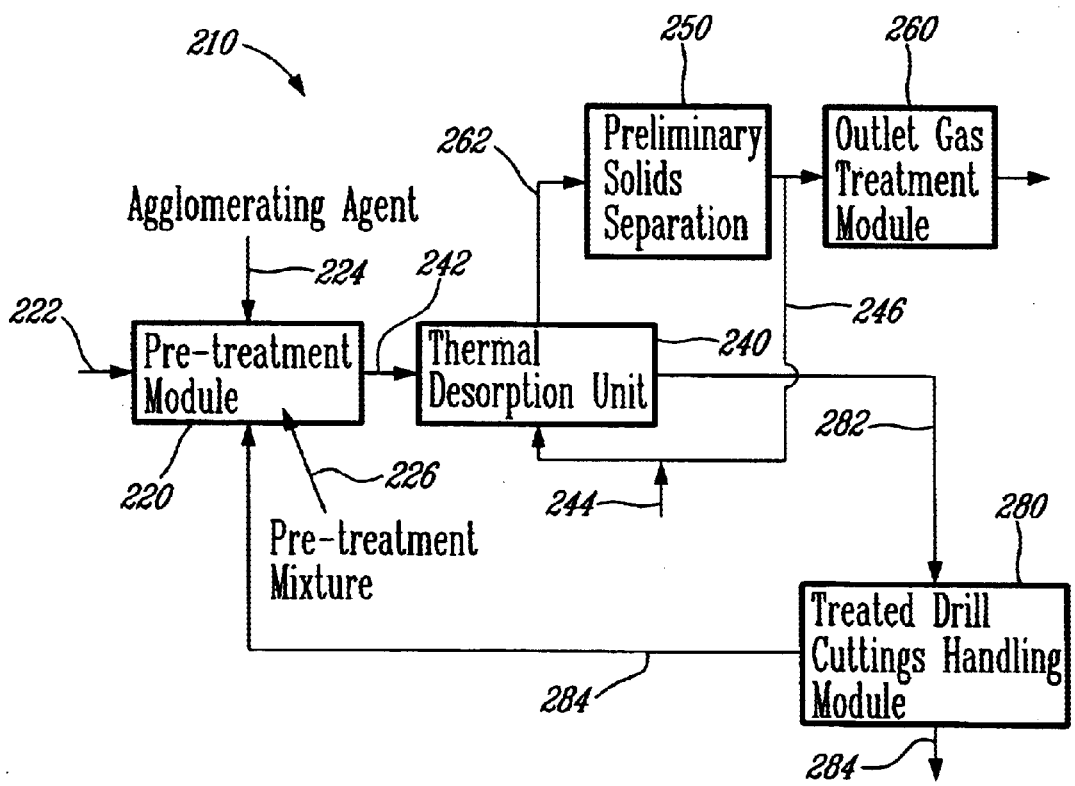
FIG. 2 is a flow diagram of another embodiment of a thermal process for treatment of hydrocarbon-contaminated drill cuttings wherein at least a portion of the treated drill cuttings are recycled.

In another preferred embodiment, illustrated in FIG. 2, at least a portion of the outlet gas 246 is recirculated to the thermal desorption unit 240. The outlet gas 246 is preferably recirculated after being treated (250) to remove at least some, if not all entrained particulates. If desired, HC vapor may be separated prior to recirculating the treated outlet gas 246. However, it is not necessary to condense the HC from the outlet gas prior to recirculating. Preferably, the treated outlet gas 246 is heated by a heating unit 244 prior to being recirculated to the thermal desorption unit 240.

Treated Drill Cuttings Handling Module

Treated drill cuttings 182 from the thermal desorption unit 140 are fed to the Treated Drill Cuttings Handling Module 180. The treated drill cuttings 182 typically have a residual HC content less than about 3 wt. %, based on the total weight of the treated drill cuttings. Preferably, the treated drill cuttings 182 have a residual HC content less than about 1 wt. %, more preferably less than about 0.5 wt. % and most preferably, less than about 0.1 wt. %, based on the total weight of the treated drill cuttings.

Because lower boiling point liquids will vaporize more readily in the thermal desorption unit 140, residual liquid, if any, present in the treated drill cuttings 182 will tend to be HC having a relatively higher boiling point. Therefore, the TLC of the treated drill cuttings 182, like the residual HC, is less than about 3 wt. %, based on the total weight of the treated drill cuttings. Preferably, the TLC of the treated drill cuttings 182 is less than about 1 wt. %, more preferably less than about 0.5 wt. % and most preferably, less than about 0.1 wt. %, based on the total weight of the treated drill cuttings.

Also, because agglomerates were formed in the thermal desorption unit 140, the treated drill cuttings 182 have a second median diameter that is greater than the first median diameter of the HC-contaminated drill cuttings 122.

Preferably, the second median diameter is at least about 1.5 times greater than the first median diameter. More preferably, the second median diameter is in a range from about 300 $\mu$m to about 2000 $\mu$m.

Because an objective of the process described herein is to avoid caking, preferably, the particle diameter of the agglomerates is not more than about 5000 $\mu$m.

In the embodiment of the thermal process for treating HC-contaminated drill cuttings in FIG. 2, parts which are the same as in FIG. 1 identified by the same integer but raised by 100. Thus, for example, the desorption unit 140 of FIG. 1 or desorption unit 240 in FIG. 2. In thermal process 210 of FIG. 2, at least a portion of the treated drill cuttings 284 are recycled to the pre-treatment module 220 to reduce the TLC of the pre-treatment mixture 226. An advantage of using previously treated drill cuttings 284 is that the total amount of solids that must later be disposed of does not increase beyond the amount recovered from the drilling operation.

The treated drill cuttings 284 may be cooled or used in a warm or hot state following treatment.

The following non-limiting example of embodiments of the present invention are provided for illustrative purposes only.

In FIG. 3, parts similar or corresponding to those of FIG. 1 are identified by the same integers but raised by 200.

EXAMPLE 1

FIG. 3 illustrates the thermal process 310 used in Example 1. A 1,000 kg sample of HC-contaminated drill cuttings was obtained from a drilling operation in Alberta, Canada. The UC-contaminated drill cuttings had a TLC of 19 wt. %, based on the total weight of the drill cuttings. The HC content was 13 wt. % and the water content was 6 wt. %, as determined by Soxhlet apparatus extraction. The particle size distribution of the HC-contaminated drill cuttings was determined by screen analysis after extraction. The results are listed in Table 1.

TABLE 1

| Particle Diameter | Feed Particle Size Distribution | |
|---|---|---|
| $\mu$m | Wt. % | Cumulative Wt. % |
| <38 | 32.0 | 32.0 |
| 38–75 | 7.3 | 39.3 |
| 75–150 | 8.1 | 47.4 |
| 150–300 | 7.2 | 54.6 |
| 300–500 | 5.3 | 59.9 |
| 500–1000 | 13.0 | 72.9 |
| 1000–2400 | 23.3 | 96.2 |
| >2400 | 3.8 | 100 |
| $d_{50}$ | 191 $\mu$m | |

The HC-contaminated drill cuttings fed via line 322 were mixed with 31 kg agglomerant fed by line 324 to produce a pre-treatment mixture in hopper 326. The agglomerant was an aqueous NaCl solution, containing 8 kg NaCl (agglomerating agent). 400 kg of treated drill cuttings were added via line 384 to the pre-treatment mixture in hopper 326 at ambient temperature. The pre-treatment mixture was mixed using a CATERPILLAR (trademark) tractor articulated front-end loader with a shale bin. The $TLC_{PT}$ of the pretreatment mixture was 15 wt. %, based on the total weight of the pre-treatment mixture. The HC content of the pre-treatment mixture was 9.1 wt. % and the water content was 5.9 wt. %.

The pre-treatment mixture was fed by line 342 to the thermal desorption unit 340, comprising a fluidized bed 341 with an integral separator 343. The feed rate to the fluidized bed 341 was 1,000 kg/hr.

Recycled gas (2,600 kg/hr) was heated to a temperature of about 430° C. in burner 345 by combustion with diesel fuel (22 kg/hr) delivered by fuel pump 348 with air for combustion delivered by fan 346. The resulting hot gas was fed via chamber 347 and line 344 to the fluidized bed 341 at a rate of 3,000 kg/hr. The operating temperature in the fluidized bed 341 was about 320° C. The fluidized bed velocity was 1.5 m/s and the fluidization range was 0.3 mm to about 6 mm, meaning that particles in this size range were fluidized but stayed in the processor.

About 810 kg coarse particles were recovered via line 382 from the fluidized bed 341. The particle size distribution for the coarse fraction is listed in Table 2. The treated drill cuttings had a residual HC content of about 0.05 wt. %.

TABLE 2

| Particle Diameter | Treated Drill Cuttings Particle Size Distribution | |
|---|---|---|
| $\mu$m | Wt. % | Cumulative Wt. % |
| <38 | 2.5 | 2.5 |
| 38–75 | 15.2 | 17.7 |
| 75–150 | 7.4 | 25.1 |
| 150–300 | 3.4 | 28.1 |
| 300–500 | 2.1 | 30.6 |
| 500–1000 | 13.2 | 43.8 |
| 1000–1180 | 7.2 | 51.0 |
| 1180–2360 | 29.9 | 80.9 |
| 2360–4750 | 14.3 | 94.9 |
| >4750 | 5.1 | 100 |
| $d_{50}$ | ~1160 $\mu$m | |

The outlet gas in line 362 was fed to a cyclone separator 364 to remove fine particulates entrained in the outlet gas.

150 kg fines were recovered via line 365 from the cyclone separator 364. Gas exiting the cyclone separator 364 via line 363, at a temperature of 280° C., was separated into two streams. A first stream in line 390 (2,600 kg/hr) was recycled back to the fluidized bed 341 by gas fan 399. The second stream via line 392 (560 kg/hr) was further treated in a baghouse separator 366 for separating ultra-fine particles. 70 kg ultra-fine particles were recovered from the baghouse separator 366 via line 371. The fines, ultra-fine particles and coarse particles were all delivered to module 380.

The gas exiting the baghouse separator 366 was then cooled and condensed in a heat exchanger 368, producing a cooled gas stream in line 394 and a liquid stream in line 396. The cooled gas stream, at 40° C., was released to atmosphere through exhaust gas fan 395 and gas control valve 397. The liquid stream was fed to separator 369 to separate condensed oil 400 from water 402. 130 kg oil and 100 kg water were recovered. Flue gas from the stream in line 394 is blown by fan 374 to pneumatically transport solids from hopper 381 to hopper 326.

What is claimed is:

1. A process for treating drill cuttings contaminated with at least one hydrocarbon, comprising the steps of:
   (a) providing hydrocarbon-contaminated drill cuttings with a first particle size distribution having a first median diameter;
   (b) mixing the hydrocarbon-contaminated drill cuttings with an agglomerant to produce a pre-treatment mixture;
   (c) establishing a pre-treatment total liquid content in the pre-treatment mixture in a range from about 5 wt. % to about 20 wt. %, based on the total weight of the pre-treatment mixture;
   (d) agitating and heating the pre-treatment mixture at a temperature sufficient to vaporize substantially all of the hydrocarbon while agglomerating vapor entrainable particles of the drill cuttings to form agglomerates; and
   (e) recovering treated drill cuttings with a second particle size distribution having a second median diameter greater than the first median diameter, the treated drill cuttings having a residual hydrocarbon content of less than or equal to about 3 wt. %, based on the total weight of the treated drill cuttings.

2. The process of claim 1, wherein the treated drill cuttings have a post-treatment total liquid content less than or equal to about 3 wt. %, based on the total weight of the treated drill cuttings.

3. The process of claim 1, wherein the first median diameter is in a range from about 15 $\mu$m to about 400 $\mu$m.

4. The process of claim 1, wherein the second median diameter is in a range from about 300 $\mu$m to about 2000 $\mu$m.

5. The process of claim 1, wherein the second median diameter is at least about 1.5 times greater than the first median diameter.

6. The process of claim 1, wherein the pre-treatment total liquid content is controlled by adding at least a portion of the treated drill cuttings from step e to the hydrocarbon-contaminated drill cuttings or the pre-treatment mixture.

7. The process of claim 6, wherein the portion of the treated drill cuttings added to the hydrocarbon-contaminated drill cuttings or the pre-treatment mixture has a particle diameter in a range from about 30 $\mu$m to about 400 $\mu$m.

8. The process of claim 1, wherein the pre-treatment total liquid content is established in c) by adding drier granular material to the hydrocarbon-contaminated drill cuttings or the pre-treatment mixture.

9. The process of claim 8, wherein the drier granular material added to the hydrocarbon-contaminated drill cuttings or the pre-treatment mixture has a particle diameter in a range from about 30 $\mu$m to about 400 $\mu$m.

10. The process of claim 8, wherein the drier granular material is selected from the group consisting of gypsum, clay, sand, silt and combinations thereof.

11. The process of claim 1, wherein the pre-treatment total liquid content is established in c) by removing liquid from the hydrocarbon-contaminated drill cuttings prior to step (b).

12. The process of claim 11, wherein liquid is removed from the hydrocarbon-contaminated drill cuttings by passing at least a portion of the hydrocarbon-contaminated drill cuttings through a press, a shaking screen, a centrifuge or a combination thereof.

13. The process of claim 1, wherein the hydrocarbon-contaminated drill cuttings have a total liquid content in a range from about 5 wt. % to about 40 wt. %, based on the total weight of the hydrocarbon-contaminated drill cuttings.

14. The process of claim 1, wherein the pre-treatment total liquid content is in a range from about 10 wt. % to about 18 wt. %, based on the total weight of the pre-treatment mixture.

15. The process of claim 1, wherein the pre-treatment total liquid content is in a range from about 14 wt. % to about 17 wt. %, based on the total weight of the pre-treatment mixture.

16. The process of claim 1, wherein the agglomerating agent is selected from the group consisting of salts, alkali metal and alkaline earth metal and combinations thereof.

17. The process of claim 16 wherein the salt is selected from the group consisting of alkali metal chlorides, chlorites, nitrates, nitrites, sulfates, sulfides, sulfites, carbonates, and alkali-earth metal chlorides, chlorites, nitrates, nitrites, sulfates, sulfides, sulfites, carbonates, and combinations thereof.

18. The process of claim 1 wherein the agglomerating agent is sodium chloride.

19. The process of claim 1 wherein the agglomerating agent is a starch.

20. The process of claim 1, wherein the agglomerating agent is added at a concentration in a range from about 0.2 wt. % to about 5 wt. %, based on the total weight of the pre-treatment mixture.

21. The process of claim 1, wherein the particle diameter of the agglomerates is less than or equal to about 5000 µm.

22. The process of claim 1, wherein the heating is in a thermal desorption unit at a temperature in a range from about 200° C. to about 400° C.

23. The process of claim 22, wherein the thermal desorption unit provides forced convection heating.

24. The process of claim 23, wherein the thermal desorption unit is a fluidized bed reactor.

25. The process of claim 24, wherein the fluidized bed reactor uses a feed gas having less than about 8% $O_2$, on a mole fraction basis.

26. The process of claim 25, wherein the feed gas is selected from the group consisting of $N_2$, $CO_2$, $H_2O$ and combinations thereof.

27. The process of claim 24, wherein pre-treatment mixture has an average residence time in the fluidized bed reactor in a range from about 1 minute to about 15 minutes.

28. The process of claim 24, wherein the average residence time in the fluidized bed reactor is in a range from about 3 minutes to about 6 minutes.

29. The process of claim 24, wherein an outlet gas from the fluidized bed reactor is treated with a preliminary solids separation process then separated into two portions, the first portion being recirculated to the fluidized bed reactor, the second being treated in a treatment process selected from the group consisting of processes to remove entrained particles, reduce the temperature of the outlet gas, condense water vapor, separate hydrocarbon vapor, and combinations thereof.

30. The process of claim 29, wherein the recirculated portion is heated prior to entering the fluidized bed reactor.

31. The process of claim 24, wherein an outlet gas from the fluidized bed reactor is treated in a treatment process selected from the group consisting of processes to remove entrained particles, reduce the temperature of the outlet gas, condense water vapor, separate hydrocarbon vapor, and combinations thereof.

32. The process of claim 31, wherein at least a portion of the treated outlet gas is recirculated to the fluidized bed reactor.

33. The process of claim 31, wherein the portion of treated outlet gas is heated prior to being recirculated.

34. The process of claim 29, wherein entrained particles are removed by centrifugal vortex separation, cyclone separation, bag-house separation, gravity settling, impingement, centrifugal separation, granular-bed separation, filtration, scrubbers, electrostatic precipitation, inertia separation and combinations thereof.

35. The process of claim 31, wherein entrained particles are removed by centrifugal vortex separation, cyclone separation, bag-house separation, gravity settling, impingement, centrifugal separation, granular-bed separation, filtration, scrubbers, electrostatic precipitation, inertia separation and combinations thereof.

36. The process of claim 29, wherein hydrocarbon vapor is separated from the outlet gas by condensing the hydrocarbon vapor to produce a condensed hydrocarbon.

37. The process of claim 31, wherein hydrocarbon vapor is separated from the outlet gas by condensing the hydrocarbon vapor to produce a condensed hydrocarbon.

38. The process of claim 36, wherein the condensed hydrocarbon is recycled for use in a drilling operation.

39. The process of claim 38, wherein the condensed hydrocarbon has a solids loading less than about 10 wt. %, based on the total weight of the condensed hydrocarbon.

40. The process of claim 1, wherein the at least one hydrocarbon in the hydrocarbon-contaminated drill cuttings is a $C_9$ to $C_{24}$ hydrocarbon.

41. A process for removing hydrocarbon contaminant from drill cuttings generated in an oil drilling operation, comprising:
   i) mixing drill cuttings containing a hydrocarbon contaminant with an agglomerant to produce a pre-treatment mixture;
   ii) heating the pre-treatment mixture at a temperature effective to vaporize the hydrocarbon contaminant of the drill cuttings, under a condition in which vapor entrainable particles of the drill cuttings are agglomerated by the agglomerant, and caking of drill cuttings is inhibited;
   iii) recovering drill cuttings having a reduced content of the contaminant, and
   iv) recovering vaporized hydrocarbons having a reduced content of vapor entrainable particles.

42. A process according to claim 41 wherein said pre-treatment mixture in ii) is in a fluidized state.

43. A process according to claim 41 wherein said condition in step ii) comprises establishing a total liquid content in the pre-treatment mixture, of above 5 wt % to about 20 wt %, based on the total weight of the pre-treatment mixture.

44. A process according to claim 43 wherein said agglomerating agent is an alkali metal or alkaline earth metal chloride.

45. A process according to claim 44 wherein said drill cuttings in i) have a first particle size distribution having a first median diameter of about 15 µm, and said drill cuttings in iii) have a second particle size distribution having a second median diameter of about 300 µm to about 200 µm, said second median diameter being at least about 1.5 times greater than said first median diameter.

* * * * *